C. W. STONE AND H. M. HOBART.
ELECTRICITY TRANSFORMING AND CONVERTING APPARATUS.
APPLICATION FILED SEPT. 6, 1916.
1,385,895.
Patented July 26, 1921.
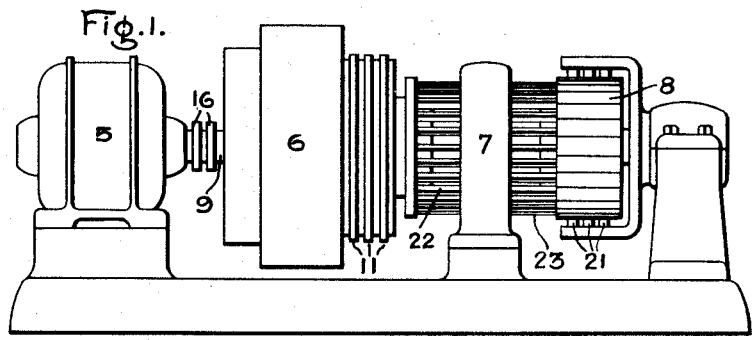
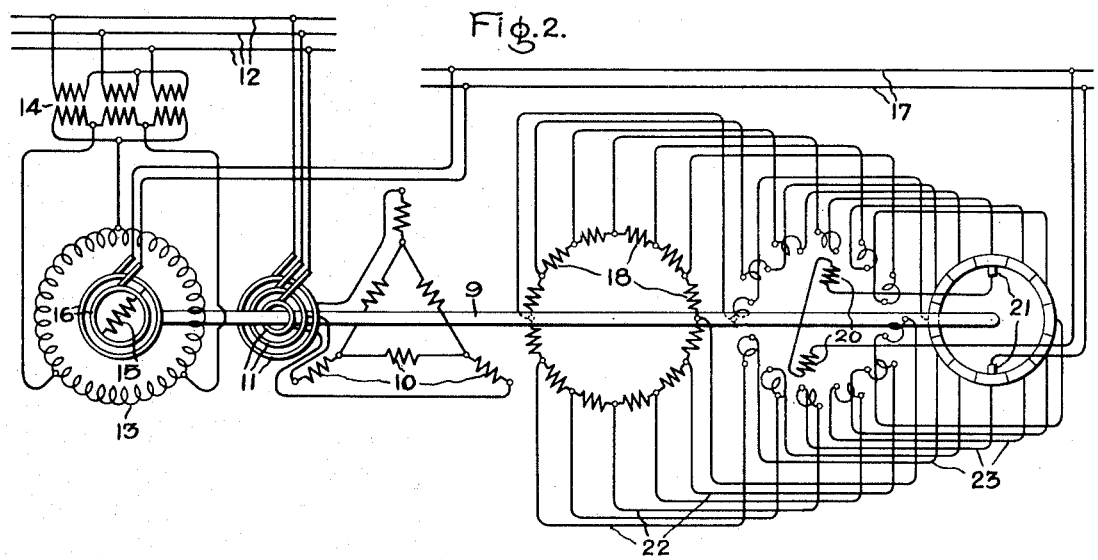
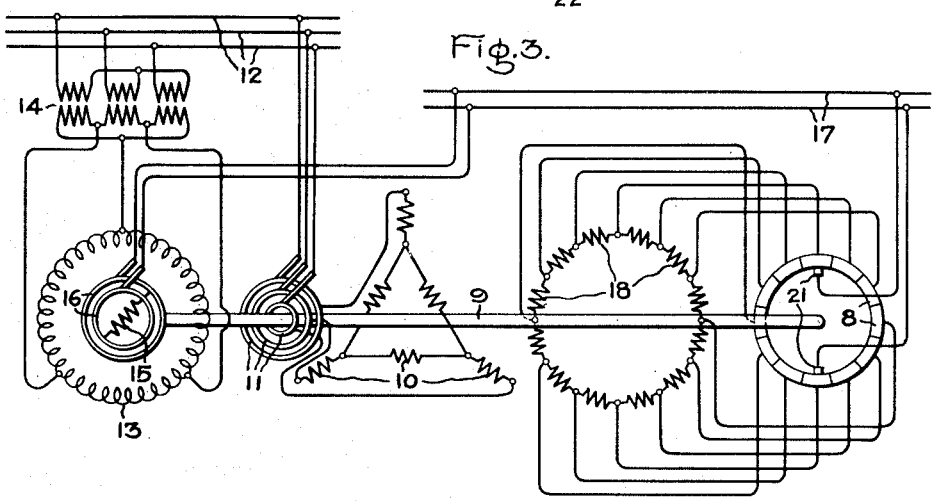
Inventors:
Henry M. Hobart,
Charles W. Stone,
by Albert G. Davis
Their Attorney.

UNITED STATES PATENT OFFICE.

CHARLES W. STONE AND HENRY M. HOBART, OF SCHENECTADY, NEW YORK, ASSIGNORS TO GENERAL ELECTRIC COMPANY, A CORPORATION OF NEW YORK.

ELECTRICITY TRANSFORMING AND CONVERTING APPARATUS.

1,385,895.      Specification of Letters Patent.     Patented July 26, 1921.

Application filed September 6, 1916. Serial No. 118,636.

*To all whom it may concern:*

Be it known that we, CHARLES W. STONE and HENRY M. HOBART, citizens of the United States, both residing at Schenectady, in the county of Schenectady, State of New York, have invented certain new and useful Improvements in Electricity Transforming and Converting Apparatus, of which the following is a specification.

Our invention relates to electricity transforming and converting apparatus, that is to say, to apparatus for performing the double function of transforming alternating current electricity from one voltage to another and of converting one form of electric energy into electric energy of another form. More specifically, our invention relates to electrical apparatus for receiving high pressure polyphase alternating current electricity from a supply system and delivering relatively low pressure direct current electricity to a distribution system.

Apparatus of the type to which our invention particularly relates are best known in the art as mechanical rectifiers. In its most usual form, a mechanical rectifier of this type consists of a revolving commutator electrically connected to the secondary winding of a transformer. The commutator is rotated by a synchronous motor, and stationary brushes bearing on the commutator take off the direct current electricity. The high pressure alternating current supply system is usually three phase, but in order to minimize the undulations of the direct current electricity delivered by the apparatus, it is desirable to supply an alternating current of a relatively large number of phases to the synchronously rotating commutator. Hence, it is customary to arrange the primary and secondary windings of the transformer so that the secondary winding is in effect a polyphase winding, such, for example, as a 12-phase, an 18-phase, or a 24-phase winding. Heretofore, the transformer has been stationary, and the secondary winding thereof has been electrically connected to the revolving commutator through collector rings and coöperating brushes. The number of collector rings required depends upon the number of phases of the secondary winding of the transformer, and in the case of a 12-, 18- or 24-phase secondary winding 12, 18 or 24 collector rings, respectively, are necessary. Such a large number of collector rings with their brushes and rigging and the conductors from the brushes to the terminals of the secondary winding of the transformer make the apparatus complicated and expensive, and in the case of large outfits, the collector rings become very large in size, in order to carry the heavy secondary currents, and occupy a relatively large amount of space.

The object of our present invention is to generally improve electricity transforming and converting apparatus of the so-called mechanical rectifier type. In this connection the particular object of the invention is to provide an improved mechanical rectifier having fewer complications in the way of collector rings, brush-rigging and conductors than any existing apparatus of this type with which we are familiar. More generally, the object of our present invention is to provide an improved apparatus for receiving polyphase alternating current electricity from a supply system and delivering direct current electricity to a distribution system. Other objects of the invention will be brought out hereinafter.

In carrying out our present invention, we mount the transformer on the same shaft as the revolving commutator. The secondary winding of the transformer is then directly connected to the appropriate segments of the commutator, thereby eliminating the large number of collector rings heretofore necessary, and the only current collecting means required in our improved apparatus are the relatively few and relatively small collector rings for the primary winding of the transformer. In order to improve the commutation of the apparatus, we prefer to interpose a dynamo-electric machine winding between the commutator and the secondary winding of the transformer, and to subject this winding to a magnetic field of substantially the same character as that produced by the interpoles in the well known synchronous converter.

The novel features of the invention which we believe to be patentably characteristic thereof are definitely set forth in the appended claims. The invention itself and the construction and mode of operation of apparatus embodying the invention will be better understood from the following description taken in conjunction with the accompanying drawing, in which:

Figure 1 is a diagrammatic elevation of an electricity transforming and converting apparatus embodying our present invention; Fig. 2 is a diagram of the electrical connections of the apparatus of Fig. 1; and Fig. 3 is a diagram of the electrical connections of a slightly modified form of the apparatus.

The apparatus of our present invention comprises in its preferred form four distinct units all mounted on a common shaft. This form of the invention is illustrated in Figs. 1 and 2 of the drawings. In these figures, a synchronous motor 5, a transformer 6, a dynamo-electric machine 7 and a commutator 8 are each mounted on a common shaft 9. Brushes 21 bear on the commutator 8 and are electrically connected to the mains of a low pressure direct current distribution system 17. The primary winding 10 of the transformer is electrically connected to a high pressure polyphase supply system 12. The alternating current stator winding 13 of the synchronous motor is connected through a small step-down transformer 14 to the supply system 12. The direct current rotor winding 15 of the synchronous motor is connected by slip rings 16 to the low-pressure direct current distribution system 17. Since the only duty of the synchronous motor 5 is to rotate the shaft 9 and assembled units at the proper synchronous speed, this motor need be of only small capacity compared with the capacity of the transforming and converting units of the apparatus. It will also be understood that this synchronous motor may be of any desired form, in fact, any other suitable independently energized means may be employed for driving the shaft 9 at the proper speed, and we have merely illustrated a synchronous motor of this particular form as a conventional means for driving the shaft 9 at such a speed that the voltage at the commutator brushes 21 is substantially unidirectional.

We have shown for the purpose of explanation a three-phase high pressure supply system. Accordingly, there are three collector rings 11. The primary winding 10 of the step-down transformer 6 consists of six separate windings, three of which are delta-connected while the other three radiate from the corners thereof, as represented in Fig. 2. There are thus in effect six primary phases. The secondary winding 18 of the stepdown transformer 6 has twelve separate windings, two associated with each primary phase - winding. The twelve secondary windings are mesh-connected, as represented in Fig. 2, forming in effect a phase multiplying transformer having a twelve-phase secondary winding. This and other means for obtaining phase multiplication in the step-down transformer are disclosed in our copending application for Letters Patent of the United States, Serial No. 118,635, filed September 6, 1916, patented April 13, 1920, No. 1,337,100. In this copending application we have also broadly described and claimed the combination of a rotating transformer in apparatus comprising a dynamo electric converter. While we have illustrated a twelve-phase secondary winding 18, it will of course be understood that the secondary winding may be connected and arranged to produce any desired number of phases, and in mechanical rectifiers of this type it will often be desirable to employ a greater number of phases in the secondary winding.

The transformer 6 may be of any suitable mechanical construction. The transformer generally will have a cylindrical magnetic core with suitable slots or windows for the primary and secondary windings. In our aforementioned application we have described in detail certain constructions of rotatable transformers which are very satisfactory for obtaining phase multiplication.

The secondary winding 18 may be directly connected to the appropriate segments of the commutator 8, as diagrammatically represented in Fig. 3. We prefer, however, to interpose an auxiliary winding 19 between the secondary winding 18 and the commutator 8, as diagrammatically represented in Fig. 2. The purpose of the auxiliary winding 19 is to improve the commutation of the apparatus, and this winding is, accordingly, so arranged that an electromotive force is induced therein to assist in reversing the direction of current flow in the coil or circuit undergoing commutation. To this end, the auxiliary winding 19 is wound on a suitable magnetic core secured to the shaft 9 and is arranged to rotate within the influence of a flux produced by stationary field coils 20. The field coils 20 are connected in series relation with the direct current brushes 21 bearing on the commutator 8. The rotatable winding 19 and stationary field coils 20 constitute in effect an auxiliary dynamo-electric machine. The space positions of the coils 20 are such that no motive effect results from the interaction of these coils and the winding 19. In fact, the position of the coils 20 corresponds to that of the interpoles of the usual direct current dynamo-electric machine of this type. The machine 7 might, indeed, be described as a synchronous converter having interpoles, but having no main poles. In other words, the line or axis of magnetization of the coils 20 is coincident with the line of magnetization of the winding 19, as determined by the brushes 21. In Figs. 1 and 2 of the drawings, the electrical connections between the secondary winding 18 and the auxiliary winding 19 are indicated at 22, while the electrical connections between the auxiliary winding 19 and the commutator 8 are indicated at 23.

From the foregoing description it will be evident to those skilled in the art that we have provided a mechanical rectifier of the rotating commutator type having fewer collector rings and much simpler electrical connections than in any prior apparatus of this character. The transformer and commutator rotate as a unit and all the well know advantages of having a large number of secondary phases can, accordingly, be secured without the attendant disadvantages and complications encountered in apparatus employing stationary step-down transformers. In fact, where the step-down transformer is mounted on the same shaft as the commutator, there is practically no limit to the number of secondary phases that may be employed, whereas in the case of stationary transformers, the number of secondary phases is practically limited by the number of collector rings which it is feasible to employ. One of the particular advantages of our present arrangement is, therefore, the simplicity with which the revolving commutator can be electrically connected to a winding of a relatively large number of phases.

The auxiliary winding interposed between the secondary winding of the transformer and the commutator is provided for the purpose of improving the commutation. Since the field coils 20 are in effect connected in series relation with the winding 19, substantially sparkless commutation can be obtained at all loads. In small outfits difficulties in commutation are not particularly annoying, and in such cases the auxiliary winding may be omitted, as shown in Fig. 3.

In the embodiments of our invention hereinbefore described, the primary and secondary windings of the transformer have rotated as a unit. The invention, may, however, be very advantageously carried out by rotating only the secondary winding of the transformer and assembling the primary winding on a stationary core section, as described and claimed in the copending application of Henry M. Hobart, Serial No. 189,504, filed September 4, 1917.

We have herein shown and particularly described certain embodiments of our invention for the purpose of explaining its principle and showing its application, but numerous modifications in the arrangement of these embodiments and other applications of the invention will present themselves to those skilled in the art. We, therefore, wish to cover by the following claims all modifications within the spirit of the invention.

What we claim as new and desire to secure by Letters Patent of the United States, is:

1. An electricity transforming and converting apparatus comprising a rotatable shaft, a phase multiplying transformer having primary and secondary windings carried by said shaft, collector rings carried by said shaft and electrically connected to the primary winding of said transformer, a commutator carried by said shaft and electrically connected to the secondary winding of said transformer, brushes bearing on said commutator, and independently energized means for rotating said shaft at such a speed that the voltage at said brushes is substantially unidirectional.

2. An electricity transforming and converting apparatus comprising a rotatable shaft, a phase multiplying transformer having primary and secondary windings, the secondary winding of said transformer being carried by said shaft, a commutator carried by said shaft, and electrically connected to the secondary winding of said transformer whereby said commutator and said secondary winding rotate as a unit, and independently energized means for rotating said shaft.

3. An electricity transforming and converting apparatus comprising a rotatable shaft, a phase multiplying transformer having primary and secondary windings carried by said shaft, electric current collecting means carried by said shaft and electrically connected to said primary winding, a commutator carried by said shaft, brushes bearing on said commutator, an auxiliary winding carried by said shaft and electrically connected between the secondary winding of said transformer and said commutator, a single magnetic field system adapted to influence said auxiliary winding and arranged with its axis of magnetization substantially coincident with the axis of magnetization of said auxiliary winding as determined by said brushes, and independently energized means for rotating said shaft.

4. An electricity transforming and converting apparatus comprising a rotatable shaft, a commutator carried by said shaft, brushes bearing on said commutator, an auxiliary dynamo-electric machine having a single magnetic field system and a winding carried by said shaft and adapted to rotate within the influence of said field system, means electrically connecting said winding to said commutator so that the axis of magnetization of the winding as determined by said brushes is substantially coincident with the axis of magnetization of the single magnetic field system of said machine, a transformer having primary and secondary windings, the secondary winding of said transformer being carried by said shaft and electrically connected to the winding of said machine, and independently energized means for rotating said shaft.

5. A mechanical rectifier comprising a rotatable commutator, brushes bearing on said commutator, a phase multiplying transformer having primary and secondary windings, the secondary winding of said transformer being electrically connected to said commutator and arranged to rotate as a unit therewith, and independently energized means for rotating said commutator and the secondary winding of said transformer as a unit.

6. A mechanical rectifier comprising a rotatable shaft, a commutator carried by said shaft, brushes bearing on said commutator, a phase multiplying transformer having primary and secondary windings, the secondary winding of said transformer being carried by said shaft and electrically connected to said commutator, and independently energized means for rotating said shaft at such a speed that the voltage at said brushes is substantially unidirectional.

7. A mechanical rectifier comprising a rotatable shaft, a commutator carried by said shaft, brushes bearing on said commutator, a transformer having primary and secondary windings, the secondary winding of said transformer being carried by said shaft and electrically connected to said commutator, independently energized means for rotating said shaft, and means included in the connections between said commutator and the secondary winding of said transformer for assisting the reversal of the current in the circuit undergoing commutation.

8. An electricity transforming and converting apparatus comprising a rotatable shaft, a commutator carried by said shaft, brushes bearing on said commutator, an auxiliary dynamo-electric machine having a single magnetic field system and a winding arranged within the influence thereof, said winding being carried by said shaft and electrically connected to said commutator so that the axis of magnetization of the winding as determined by said brushes is substantially coincident with the axis of magnetization of the single magnetic field system of said machine, said magnetic field system including a stationary field winding electrically connected in series relation with said brushes, a transformer having primary and secondary windings, the secondary winding of said transformer being carried by said shaft and electrically connected to the winding of said machine, and independently energized means for rotating said shaft.

9. A mechanical rectifier comprising a rotatable shaft, a commutator carried by said shaft, brushes bearing on said commutator, a transformer having primary and secondary windings, the secondary winding of said transformer being carried by said shaft and electrically connected to said commutator, a commutating-winding included in the connections between said commutator and the secondary winding of said transformer, said commutating winding being carried by said shaft, a single magnetic field system adapted to influence said commutating winding, said magnetic field system including a stationary field winding electrically connected in series relation with said brushes and arranged with its axis of magnetization coincident with the magnetizing axis of said commutating winding as determined by said brushes, and independently energized means for rotating said shaft.

In witness whereof we have hereunto set our hands this 5th day of September, 1916.

CHARLES W. STONE.
HENRY M. HOBART.